United States Patent [19]
Cohen

[11] 3,790,334
[45] Feb. 5, 1974

[54] MANUFACTURE OF LIGHTWEIGHT AGGREGATE

[75] Inventor: Sidney M. Cohen, Allentown, Pa.

[73] Assignee: Fuller Company, Catasauqua, Pa.

[22] Filed: May 22, 1972

[21] Appl. No.: 255,556

[52] U.S. Cl. .................................. 432/58, 34/57 R
[51] Int. Cl. ............................................ F27b 15/00
[58] Field of Search ............ 432/58, 15, 16; 34/57 E

[56] References Cited
UNITED STATES PATENTS

| | | | |
|---|---|---|---|
| 3,140,862 | 7/1964 | Schoppe | 34/57 E |
| 3,238,634 | 3/1966 | Goins | 432/16 |
| 3,635,455 | 1/1972 | Johnson | 432/16 |

*Primary Examiner*—John J. Camby
*Attorney, Agent, or Firm*—Jack L. Prather et al.

[57] ABSTRACT

A method of and apparatus for making sealed surface fine lightweight aggregate particles in a fluid bed reactor which includes a method and apparatus for preheating the raw feed material. The reactor includes a gas permeable grid which supports a bed of material. Fluidizing air is supplied to the plenum below the grid for passage through the grid for fluidizing the particles of material in the vessel. Fuel is supplied to the fluidized bed for combustion therein to heat the material to a temperature range such that a pyroplastic surface will be formed on the surface of the particles of material and at same temperature range, gas forming components in the material will release a bloating gas. The material is then rapidly cooled. The preheater is of the suspension type and includes a plurality of serially flow connected gas-solids separators such as cyclones. Raw feed material having a particle size range up to ⅜ inch is supplied to a stream of hot gases and it is entrained in those hot gases and then separated in a cyclone. The material discharged from the one cyclone is reentrained in other hot gases and separated in a second cyclone. From the second cyclone, the material is discharged to the reactor. The original source of hot gases is the hot spent fluidizing gas from the reactor.

5 Claims, 1 Drawing Figure

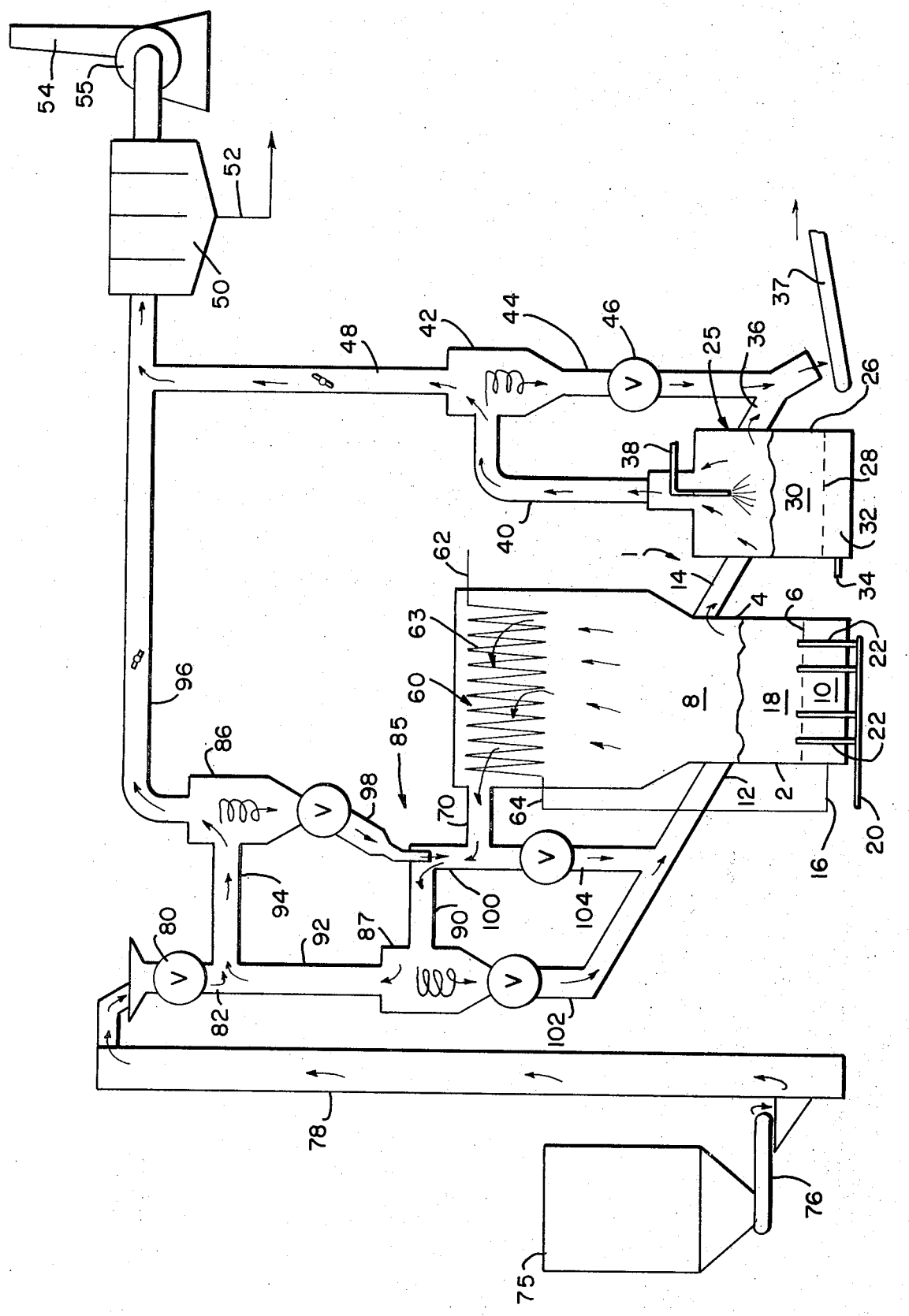

3,790,334

MANUFACTURE OF LIGHTWEIGHT AGGREGATE

BACKGROUND OF THE INVENTION

This invention is an improvement over my copending U. S. Pat. Application Ser. No. 51,702, filed July 1, 1970.

The present invention relates to a method and apparatus for carrying out such method for heating and expanding argillaceous rock materials to form sealed surface lightweight aggregate particles. The invention is particularly directed to apparatus for and a method of making sealed surface fine lightweight aggregate particles from a raw material having a particle size from substantially zero up to approximately ⅜ inch.

As in my prior U. S. Patent application, the present invention deals with fine sealed surface particles of lightweight aggregate manufactured from clays, shales, slates and the like. The lightweight aggregate is formed by heating particles of such material to a high temperature in the range of 1,900° to 2,200°F. At this temperature, a pyroplastic condition is formed on the surface of such particles. A bloating agent which may be naturally present in the raw material or which may be added to the raw material as a preliminary step releases gases from the material causing the material to expand and become porous. If the material is then rapidly cooled, the pyroplastic surface on the material will become hard thereby forming a sealed surface product which includes a porous core.

Lightweight aggregate is used in the making of high strength, relatively lightweight concrete and concrete blocks. In order to manufacture small structures such as concrete blocks and make good concrete, it is important to add small particles of lightweight aggregate. With some methods of manufacture, such as when a rotary kiln is used, particles mostly larger than ⅜ inch must be crushed in order to obtain small particles. This crushing exposes the porous inner core of the particles thereby increasing the water absorbency of the aggregate and thereby destroying a primary advantage of sealed surface lightweight aggregate. In my prior application Ser. No. 51,702, filed July 1, 1970, I disclosed a method and apparatus for manufacturing small particles of lightweight aggregate.

Some materials which are used to manufacture particles of lightweight aggregate tend to decrepitate due to thermal shock if they are suddenly subjected to the high temperatures necessary to form the pyroplastic surface on the material. This thermal shock will result in an explosion of the material producing fine particles which will be of substantially no value. In order to overcome this decrepitation due to thermal shock, such materials must be first heated to a temperature on the order of 600° to 1400°F and then rapidly heated to the 1,900° to 2,200°F range. In my prior application, Ser. No. 51,702, filed July 1, 1970, I set forth two possible means for preheating the raw material. In one embodiment of that application, a rotary kiln is used for preheating the raw feed material, and in another embodiment, a fluid bed apparatus is used for preheating raw material.

The rotary kiln adequately preheats the material but has the disadvantage that it substantially increases the cost of the overall apparatus; it is difficult to maintain seals between the rotary kiln and the fluid bed reactor; and the rotary kiln is difficult to position so that it properly discharges material into the fluid bed reactor.

The use of a fluid bed apparatus for preheating also has the disadvantage of adding to the high cost of the plant. Like the rotary kiln, it is difficult to maintain proper seals between the fluid bed preheating apparatus and the main process reactor. With a fluid bed reactor used as a preheater, thermal equilibrium will be established between the raw material and the hot gases used for preheating the material. Thus, if the gas used for preheating the raw material is at 1,500°F and the material to be heated enters the fluid bed preheater at 70°F, the raw material may be heated to 600°F and the gas discharged from the preheater will be at 600°F.

By the present invention, I have provided a preheater to be used with a fluid bed reactor for manufacturing fine particles of lightweight aggregate which is economical to manufacture and install and economically preheats the raw material. The preheater employed in the present invention is a direct heat exchanger with the hot gases entraining the material to thereby heat the material and then the heated material is separated from the gases. This preheater has the advantage that the raw material can be heated to a higher temperature than with other preheating apparatus with a given temperature preheating gas.

With the preheater of the present invention, a preheating gas at 1500°F may heat the raw material supplied to the main reactor to 800°F and the spent preheating gas may be discharged at 400°F. Thus, a more efficient preheating apparatus is provided and this results in a more efficient and economical method and apparatus for manufacturing fine particles of lightweight aggregate.

SUMMARY

It is, therefore, the principal object of this invention to provide a method of manufacturing fine particles of lightweight aggregate including a more efficient preheating method.

It is a further object of this invention to provide a novel apparatus for manufacturing fine particles of lightweight aggregate which employs a novel preheating apparatus to prevent raw material from decrepitating due to thermal shock.

In general, the foregoing and other objects will be carried out by providing a method of manufacturing fine particles of lightweight aggregate from raw feed materials such as shales, clays, slates and the like comprising the steps of selecting a supply of raw feed material, conveying the supply of raw feed material to a stream of hot gases and entraining the material in the stream of hot gases whereby the material is heated by the hot gases; separating the entrained material from the gases; conveying the separated material to a fluidized bed reactor; passing a gaseous fluid upwardly through the material in the reactor to fluidize the material; maintaining the fluidized material at a predetermined temperature range for a period of time sufficient to produce pyroplastic condition in the particles of the fluidized mass; discharging material from the reactor; discharging spent fluidizing gases from the reactor to serve as the stream of hot gases for entraining and heating raw feed material; and cooling material discharged from the reactor.

The objects of this invention will also be carried out by providing apparatus for manufacturing fine particles of lightweight aggregate comprising a pretreater for drying and preheating raw feed material including a gas-solids separator, means for supplying hot gases to said separator, means for supplying particles of feed material from a source to said means for supplying hot gases whereby the feed material is entrained in the hot gases and conveyed to said separator and said feed material and hot gases are separated in said separator, means for discharging separated gases from said separator, and means for discharging separated feed material from said separator; a fluidized bed reactor including a vessel, a gas permeable grid dividing the vessel into an upper material chamber and a lower plenum chamber, means flow connected to the means for discharging separated feed material from said separator for supplying said separated feed material to said upper material chamber, means for supplying gaseous fluid to said lower plenum chamber for passage through the gas permeable grid to fluidize material in the material chamber, means for supplying fuel to the material chamber for combustion therein for heating the material to a temperature sufficient to achieve a pyroplastic condition in the particles of material, means for discharging material from the material chamber, and means for discharging hot, spent fluidizing gases from the upper material chamber; said means for discharging hot, spent fluidizing gases being flow connected to said means for supplying hot gases to said separator; and means flow connected to said means for discharging material from the material chamber for cooling the material discharged from said material chamber.

BRIEF DESCRIPTION OF THE DRAWING

The invention will be described in connection with the annexed drawing wherein:

The single FIGURE diagrammatically shows the apparatus of the present invention.

DESCRIPTION OF THE PREFERRED EMBODIMENT

Referring to the drawing, the actual formation of the particles of sealed surface lightweight aggregate takes place in the fluid bed reactor and cooling apparatus generally indicated at 1. This reactor and the process carried out therein is substantially the same as is shown and described in my copending application Ser. No. 51,702, filed July 1, 1970. The reactor 2 includes a vessel 4 having a gas permeable grid 6 dividing the vessel into an upper material chamber 8 and a lower plenum chamber 10. The vessel includes an inlet 12 for admitting material to be processed into the chamber 8 and an overflow outlet 14 for discharging material from the chamber 8.

Gaseous fluid under pressure is supplied from a source through a conduit 16 to the plenum 10. From the plenum 10 the gaseous fluid passes through the gas permeable grid 6 to fluidize the particles of material in the material chamber 8 and form a fluid bed of material 18. Fuel for combustion in the bed 18 is supplied from a source through a conduit 20 to conduits 22 which pass through the grid 6. In the fluid bed 18, the fuel from the conduits 22 and the fluidizing air combine so that combustion takes place within the bed to thereby heat particles of material in the chamber 8 to a temperature from 1,900° to 2,200°F, depending on the particular material being treated.

Material to be treated is continuously supplied through the conduit 12 and treated material is continuously discharged through the conduit 14. The length of time the material remains in the chamber 8 can be controlled by controlling the material feed rate through inlet 12 or by changing the position of the outlet 14.

In the material chamber 8, the material is immediately subjected to the high temperatures present in the fluid bed 18. At this temperature, a pyroplastic surface is formed on the particles and bloating gases are released to expand the material.

In order to form a sealed surface on the particles of material, a cooler generally indicated at 25 is provided. This cooler may include a vessel 26 having a gas permeable grid 28 mounted therein dividing the vessel into an upper material chamber 30 and a lower plenum 32. Cool air is supplied through a conduit 34 to the plenum 32 for passage through the grid 28 to fluidize particles of material in the vessel 26 to thereby cool such material. The conduit 14 from the vessel 4 continuously supplies material to the cooler 25 and an overflow outlet 36 continuously discharges material from the cooler 25. If desired, a pipe 38 may be provided for selectively supplying water for quench cooling the material. This water is sprayed onto the surface of the material in the chamber 30. From conduit 36, the cooled product is conveyed to storage by any suitable means such as a conveyor 37.

In the cooler 25, the pyroplastic surface on the particles of expanded material is hardened to thereby form a sealed surface. This sealed surface prevents moisture from entering the porous core of the particles of lightweight aggregate in a manner well known to those skilled in the art.

Spent cooling air is discharged from the cooler 25 through a conduit 40 which conducts the spent cooling air and any entrained particles to a gas-solids separator such as a cyclone 42. Separated solid material is discharged through an outlet conduit 44, valved at 46, from the cyclone 42 to join the conduit 36 to supply product to a conveyor 37. Gaseous fluid discharged from the separator 42 is carried by a conduit 48 to a high efficiency gas-solids separator 50 such as a baghouse or electrostatic precipitator. Solids separated in the separator 50 are discharged to a suitable conduit 52 and gases are discharged to a stack 54 by means of a fan 55.

In order to increase the efficiency of the reactor 4, an indirect heat exchanger generally indicated at 60 is provided in the vessel 4 above the fluid bed 18. This heat exchanger may include a conduit 62 connected to a source of gaseous fluid at one end, a conduit 63 in the heat exchanger and an outlet conduit 64 at the other end. The conduit 64 is flow connected to the conduit 16 to supply fluidizing gas to the plenum 10. The spent fluidizing gases are at a high temperature due to the combustion of fuel in the fluid bed 18. These high temperature gases flow over the conduit 63 to heat gas in the conduit 63. These hot gases are then supplied to the plenum 10 so that less fuel need be supplied to the fluid bed 18 for achieving the necessary temperatures. After passing through the heat exchanger 60, hot spent fluidizing gases are discharged through an outlet 70. When positioned in the upper part of the vessel 4, the bottom of the heat exchanger 60 is considered to be the inlet for hot gases and the top of the heat exchanger, the outlet for hot gases. Although the embodiment illustrated shows the heat exchanger 60 positioned in the vessel 4, it may be separate from this vessel.

Raw material to be treated is supplied from a source such as a silo 75 onto a conveyor 76 which drops materials into a bucket elevator 78. From the bucket elevator, the material is discharged through a valved inlet 80 to a conduit 82.

The raw material preheater generally indicated at 85 is of the suspension type and heats and dries the raw feed material by direct contact between the raw feed and hot gases. The preheater 85 includes at least one and preferably a plurality of serially connected gas-solids separators such as cyclones. In the embodiment shown, there are two such cyclones 86 and 87. Hot spent fluidizing gases discharged through conduit 70 are conducted by a conduit 90 to the cyclone 87. Gases discharged from the cyclone 87 are conducted by conduits 92 and 94 to another cyclone 86. Hot gases discharged from the cyclone 86 are conducted by a conduit 96 to the separator 50. Solid material discharged from the cyclone 86 is conducted through valved conduit 98 to a conduit 100 which connects conduit 70 to conduit 90.

The material to be treated is discharged from conduit 82 into conduit 92 and hot gases discharged from cyclone 87 entrain this material and carry such material through conduit 94 to the cyclone 86. While the material is entrained in the hot gases, the material is in direct heat exchange with these gases and the gases are losing their heat to the material. In the cyclone 86, the heated material is separated from the now cooler gases with the gases going through conduit 96 to the separator 50 and the separated material being discharged through conduit 98 to conduit 100. In conduit 100, the material is entrained in the hot gases discharged from the vessel 4 through conduit 70 and conveyed by such hot gases through conduit 90 to the separator 86. While these particles of material are entrained in the hot gases, they are heated to a high temperature by the direct contact with the hot gases. In the separator 86, the heated particles of material are discharged through a valved conduit 102 which is flow connected with the inlet 12 of the vessel 4. An additional valved conduit 104 is used for conducting particles of material which may not be entrained in the hot spent fluidizing gases in conduit 100 from the conduit 100 to the conduit 12.

Thus, it can be seen that particles of raw feed material are first partially preheated in the most upstream, in the direction of material flow, gas-solids separator 86 by hot gases discharged from the next downstream gas-solids separator and then further preheated in the most downstream, in the direction of material flow, gas-solids separator 87 by hot gases discharged from the reactor 2. If additional preheating is desired, additional preheating stages or gas-solids separators may be interposed between the most upstream stage, cyclone 86, and the most downstream stage, cyclone 87.

As outlined in my prior application, the raw material has a particle size range from substantially zero up to approximately ⅜ inch and distributed in approximate accordance with a normal distribution curve. This particle size range produces lightweight aggregate having a particle size range which is good for making products where small particles of lightweight aggregate are used. However, the method and apparatus of the present invention may also be used where the particle size range is more limited such as from about zero up to about 3/16 inch.

Although the preheater is not per se novel and has been employed with rotary kilns for manufacturing material such as Portland cement, it is believed that the present invention is the first application of such a preheater to a fluid bed reactor for manufacturing lightweight aggregate. The use of this preheater with a fluid bed reactor is shown in prior U. S. Pat. No. 3,529,356 but it is believed that the use of such a preheater with a fluid bed reactor for manufacturing lightweight aggregate has not been known prior to the present invention.

In view of the foregoing, it is believed that the objects of the invention have been carried out. Both the method and apparatus of the present invention should be apparent from the description. It is intended that the foregoing description be merely that of a preferred embodiment and that the invention be limited solely by that which is within the scope of the appended claims.

I claim:

1. Apparatus for manufacturing fine particles of lightweight aggregate comprising:

a pretreater for drying and preheating raw feed material including a gas-solids separator, means for supplying hot gases to said separator, means for supplying particles of feed material from a source to said means for supplying hot gases whereby the feed material is entrained in the hot gases and conveyed to said separator and said feed material and hot gases are separated in said separator, means for discharging separated gases from said separator, and means for discharging separated feed material from said separator;

a fluidized bed reactor including a vessel, a gas permeable grid dividing the vessel into an upper material chamber and a lower plenum chamber, means flow connected to the means for discharging separated feed material from said separator for supplying said separated feed material to said upper material chamber, means for supplying gaseous fluid to said lower plenum chamber for passage through the gas permeable grid to fluidize material in the material chamber, means for supplying fuel to the material chamber for combustion therein for heating the material to a temperature sufficient to achieve a pyroplastic condition in the particles of material, means for discharging material from the material chamber, and means for discharging hot, spent fluidizing gases from the upper material chamber;

said means for discharging hot, spent fluidizing gases being flow connected to said means for supplying hot gases to said separator; and means flow connected to said means for discharging material from the material chamber for cooling the material discharged from said material chamber.

2. Apparatus for manufacturing fine particles of lightweight aggregate according to claim 1 wherein there are a plurality of serially flow connected gas-solids separators each including an inlet for gaseous entrained solids, an outlet for separated solids and an outlet for separated gases; the most downstream separator in the direction of material flow adapted to discharge separated solids into the upper chamber of the fluidized bed reactor and adapted to receive particles of material from the adjacent upstream separator entrained in hot, spent fluidizing gases discharged from the upper material chamber of the fluidized bed reactor, and the most upstream separator in the direction of material flow adapted to receive raw feed material from a source entrained in gases discharged from the adjacent downstream separator and discharge separated material into the stream of gases supplied to the adjacent downstream separator.

3. Apparatus for manufacturing fine particles of lightweight aggregate according to claim 2 further comprising indirect heat exchanger means including inlet means for receiving hot, spent fluidizing gases from said reactor and outlet means for discharging hot, spent fluidizing gases to the most downstream separator, and conduit means flow connecting a source of gaseous fluid and said means for supplying gaseous fluid to said lower plenum chamber whereby the hot, spent fluidizing gases are in heat exchange contact with the conduit means flow connecting the source of gaseous fluid and said means supplying gaseous fluid to said lower plenum chamber and said gaseous fluid in said conduit means is heated.

4. Apparatus for manufacturing fine particles of lightweight aggregate according to claim 1 wherein said means for cooling material discharged from said upper material chamber includes a vessel having a gas permeable grid dividing the vessel into upper and lower chambers, means for supplying material to be cooled to the upper chamber, means for supplying gaseous fluid to the lower chamber for passage through said gas permeable grid for cooling material in said upper chamber, and means for discharging cooled material from said upper chamber.

5. Apparatus for manufacturing fine particles of lightweight aggregate according to claim 4 wherein said means for cooling material further includes means for selectively supplying quench water to the surface of material in the upper chamber.

* * * * *